United States Patent [19]

Tattersall et al.

[11] 4,444,143
[45] Apr. 24, 1984

[54] MARINE VEHICLES

[75] Inventors: Edward G. Tattersall, Southampton; Jack Ruler, Maidstone, both of England

[73] Assignees: Vosper Hovermarine Limited; Marconi Avionics Limited, both of England

[21] Appl. No.: 284,455

[22] Filed: Jul. 17, 1981

Related U.S. Application Data

[63] Continuation-in-part of Ser. No. 46,071, Jun. 6, 1979, abandoned.

[30] Foreign Application Priority Data

Jun. 6, 1978 [GB] United Kingdom ............... 26395/78

[51] Int. Cl.³ .............................................. B63B 1/38
[52] U.S. Cl. ............................ 114/67 A; 114/144 E; 114/163
[58] Field of Search ............... 114/67 A, 126, 144 E, 114/275, 163

[56] References Cited

U.S. PATENT DOCUMENTS

| | | | |
|---|---|---|---|
| 3,156,209 | 6/1963 | Ask | 114/275 |
| 3,469,550 | 9/1969 | Priestley | 114/275 |
| 3,511,204 | 5/1970 | Tattersall | 114/67 A X |
| 3,548,776 | 12/1970 | Ford et al. | 114/67 A X |
| 3,559,608 | 2/1971 | Tattersall | 114/67 |
| 3,886,884 | 6/1975 | Stark et al. | 114/275 |
| 3,902,051 | 8/1975 | Betten | 114/275 |

FOREIGN PATENT DOCUMENTS 1189972  4/1970  United Kingdom .

Primary Examiner—Sherman D. Basinger
Attorney, Agent, or Firm—Steele, Gould & Fried

[57] ABSTRACT

A marine vehicle, which may comprise a sidewall gas-cushion vehicle, is provided with a pair of steering rudders, a sensor for detecting incipient undesirable motions of the vehicle, and an electrical, mechanical, and/or hydraulic system, or a hybrid thereof, for operating the rudders so as to apply restoring forces to the vehicle. The steering rudders are mounted beneath the vehicle and on opposite sides of the longitudinal axis thereof, being disposed in planes which are inclined to the vertical and which intersect above the rudders. The sensor for detecting incipient undesirable motions of the vehicle may comprise an angular rate and/or an accelerometer. The signal output of the sensor is applied to a band pass filter of pre-determined transfer function and the filtered sensing signal is applied to a summing point, to which is also applied a steering command signal.

16 Claims, 16 Drawing Figures

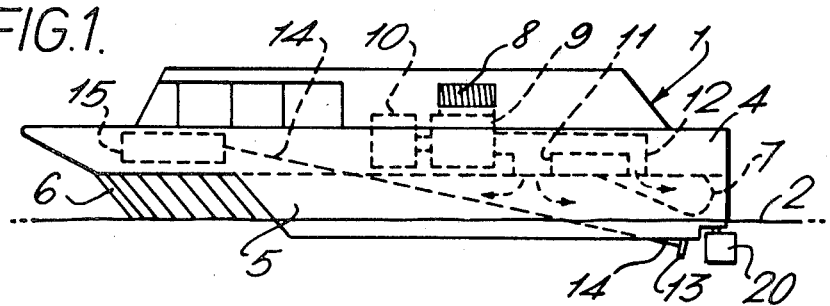
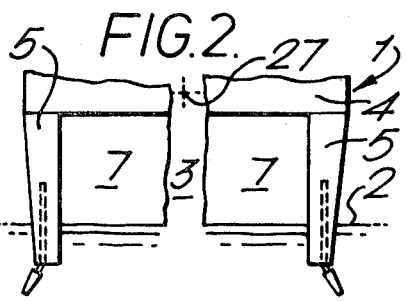
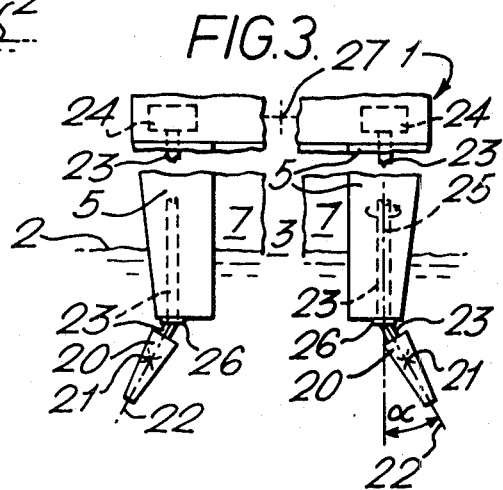
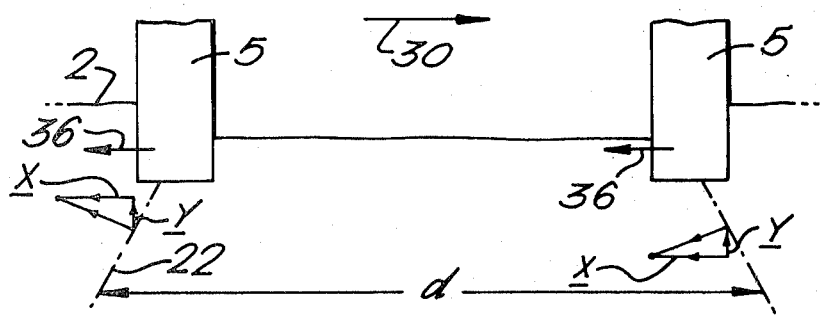

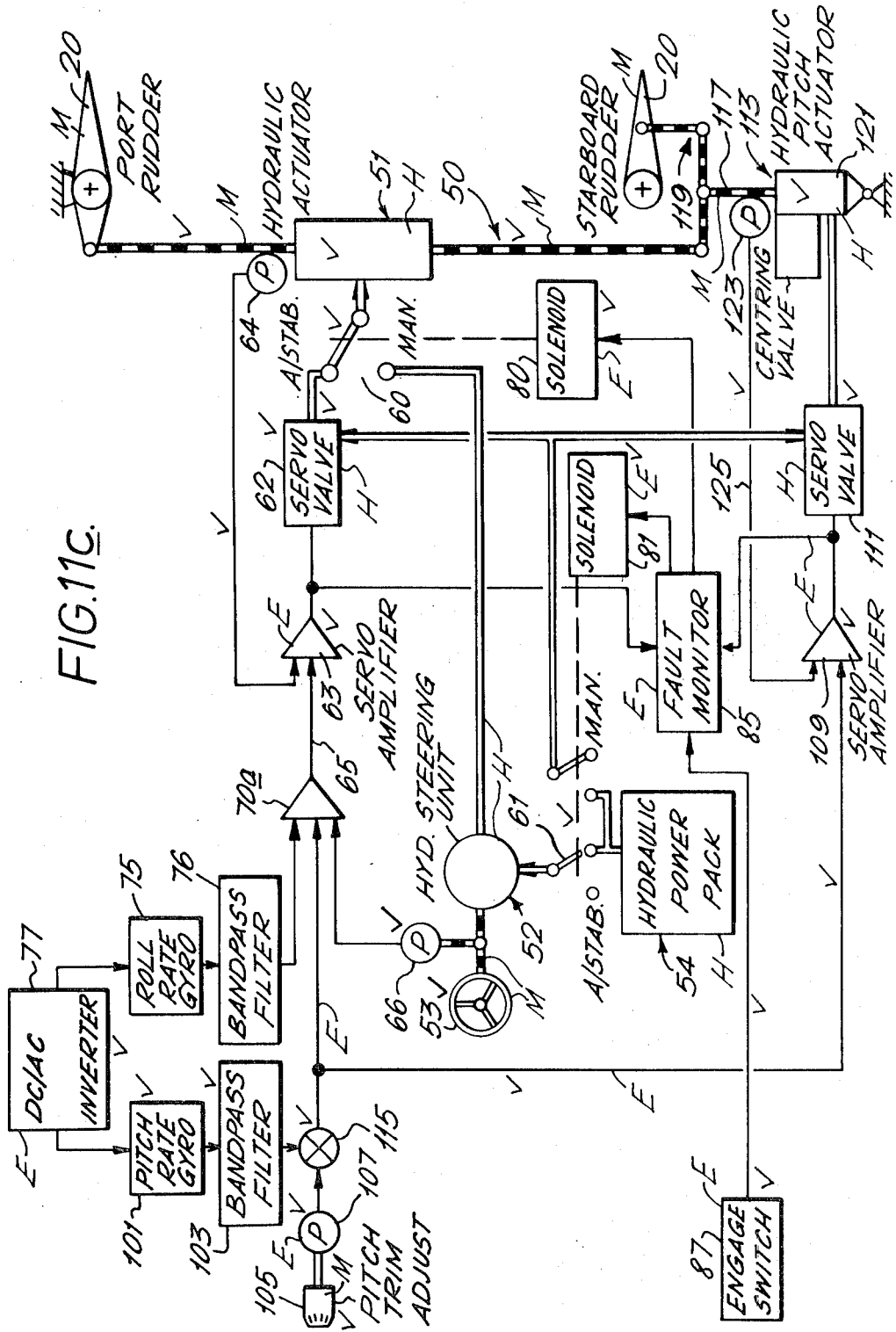

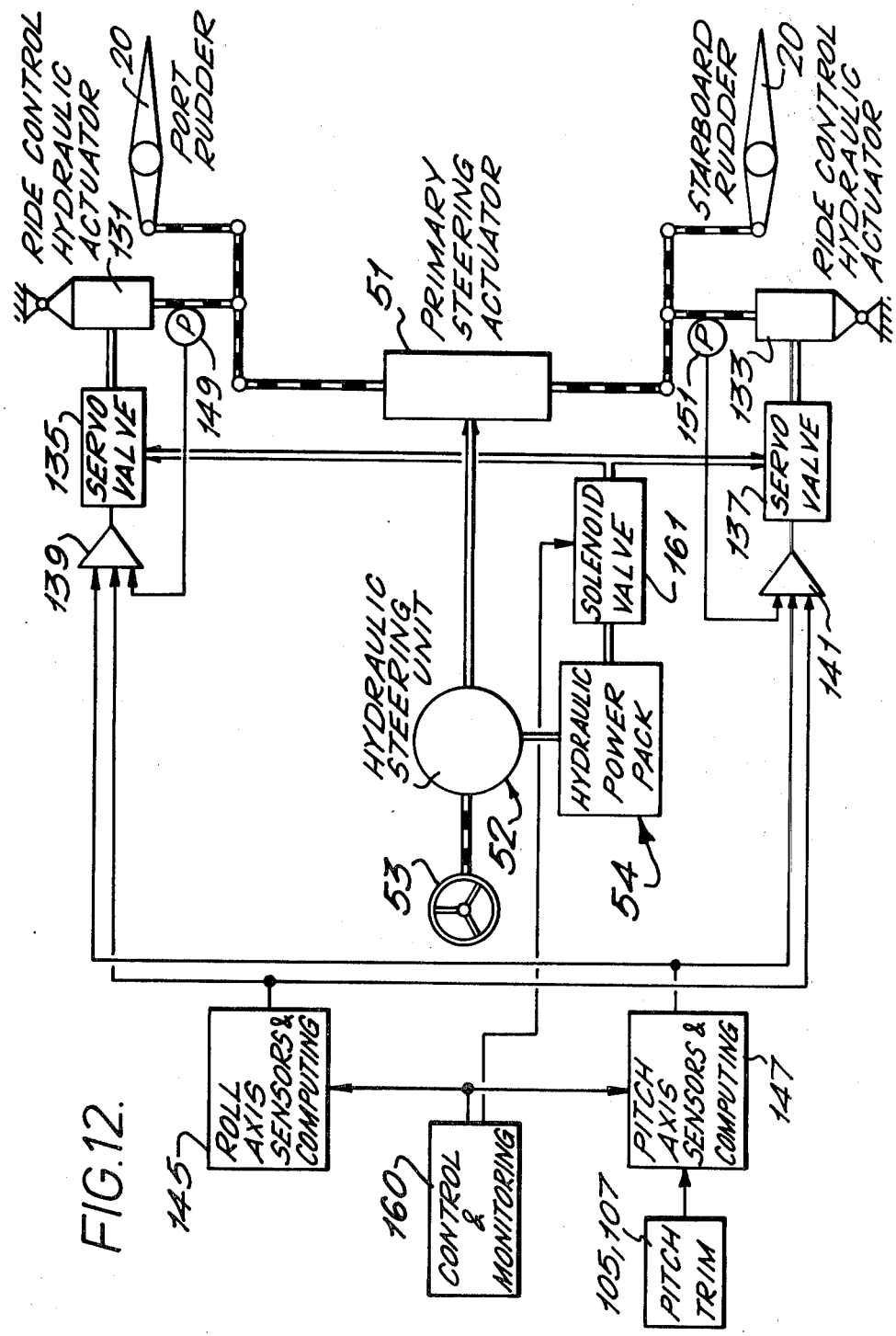

MARINE VEHICLES

This is a continuation-in-part of Application Ser. No. 46,071 filed June 6, 1979 (now abandoned).

BACKGROUND TO THE INVENTION

This invention relates to marine vehicles and is particularly, but not exclusively, concerned with gas-cushion vehicles for operating over water.

Such a gas-cushion vehicle, is, in operation, supported above the surface of water, at least in part, by a cushion of pressurized gas, for example air, formed and contained between the vehicle body and the water surface.

The present invention is applicable to "sidewall" gas-cushion vehicles. That is to say, to gas-cushion vehicles, wherein, in operation, the sides of each of their vehicle-supporting cushions are contained by a pair of laterally-spaced "side" wall structures extending longitudinally along the sides of the vehicle body in substantially parallel array and depending therefrom so as to dip into the water and form a cushion-gas seal.

However, the invention may also be applied to other types of gas-cushion vehicles, for example, as described and claimed in British Pat. No. 1,184,062, corresponding to U.S. Pat. No. 3,559,608 (Tattersall).

The present invention is concerned with improving the "ride" of marine vehicles.

SUMMARY OF THE INVENTION

According to the invention, a marine vehicle comprises a pair of rotatable steering rudders mounted beneath the vehicle and on opposite sides of the longitudinal axis thereof, the rudders being disposed in planes which are inclined to the vertical and which intersect above said axis; and, means for sensing incipient undesirable motions of the vehicle about the pitch and roll axes of the vehicle, and operable so as to continuously apply restoring forces to the vehicle by rotating the rudders in movements which are compounded with steering movements.

Examples of rudder arrangements used by the invention are described and claimed in British Patent Specification Nos. 1,189,972 and 1,212,380.

The invention makes use of angularly disposed steering rudders to control pitch and roll motions of a marine vehicle during all phases of operation, and not merely with respect to improving orientation of the vehicle during banked turns.

The steering rudders move in response to compound or composite command signals. One portion of the compound signal represents a steering signal and the other portion represents a motion damping signal. Accordingly, control of pitch and roll motions is achieved irrespective of whether the marine vehicle is moving straight ahead or is turning. Irrespective of the orientation of the rudders required to properly steer the vehicle, the movements necessary to control the pitch and roll motions are superimposed on the steering movements.

The means for sensing incipient undesirable motions are operable so as to continuously apply restoring forces to the vehicle by rotating the rudders in movements which are compounded with steering movements.

The invention provides a marine vehicle whereby responses to changes in roll are substantially faster than responses to changes in direction. Consequently, although movement of the steering rudders to correct roll will tend to initiate a change in vehicle heading, the corrections will take place before any significant change in heading can occur.

The means for sensing incipient undesirable motions of the vehicle may comprise angular rate and/or accelerometer means.

The output of the motion-sensing means may be applied to a band pass filter of predetermined transfer function and the filtered sensing signal may be applied to a summing point, to which is also applied a steering command signal. The output of the summing point can then be used to operate the hydrodynamic means.

The invention also comprises an autostabilizer system for a marine vehicle provided with twin rudders mounted beneath the vehicle and on opposite sides of the longitudinal axis thereof, the rudders being disposed in planes which are inclined to the vertical and which intersect above the rudders, said stabilizer system comprising angular rate sensor means, steering command signal generating means, rudder actuator means, band pass filter means for receiving the output of the rate sensor means, signal summing means for combining the outputs of said band pass filter means and said steering command signal generating means, and for providing a compound signal output for application to said rudder actuator means and which comprises a steering signal component and an angular motion damping signal component.

BRIEF DESCRIPTION OF THE DRAWINGS

An embodiment of the invention will now be described by way of example, with reference to the accompanying drawings, wherein:

FIG. 1 is a side view of a "sidewall" gas-cushion vehicle,

FIG. 2 is a rear view of part of the vehicle and to a slightly enlarged scale,

FIG. 3 is another rear view of the vehicle, this time in "broken" form and to a further enlarged scale, FIG. 4 is a diagrammatic rear-end view of the vehicle and illustrates the forces created by the steering control members, FIGS. 11a, 11b, 11c and 11d illustrate the system of FIG. 10 in different operational modes or configurations identified by the wording in the respective figures, and FIGS. 12 and 13 depict alternative forms of combined pitch and roll damping systems.

In the figures, like reference numerals refer to like components.

DETAILED DESCRIPTION OF THE PREFERRED EMBODIMENT

Figure 5:
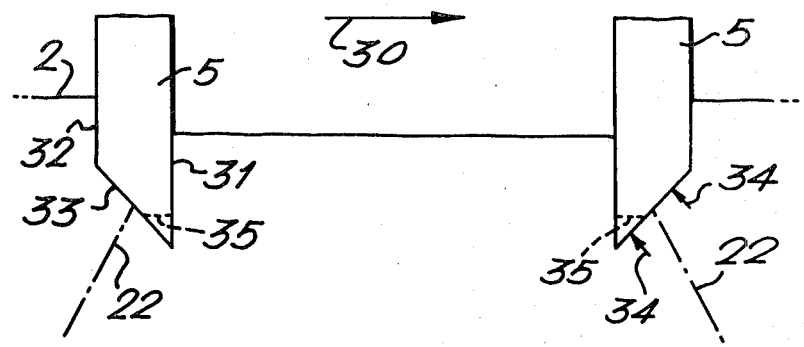
FIG. 5 is a view generally similar to FIG. 4 but illustrating a modification of the vehicle.

With reference to FIGS. 1 to 3, a "sidewall" gas-cushion vehicle 1 travels over a water surface 2 and is supported thereover by a cushion 3 (not FIG. 1) of pressurized air formed between the vehicle body 4 and the water 2. The sides of the vehicle-supporting air-cushion 3 are contained by a spaced pair of longitudinal hulls or sidewalls 5 of solid construction extending lengthwise along the sides of the vehicle body 4 and depending therefrom to dip into the water 2 and effect a seal. The bow end of the cushion 3 is contained by a multi-part flexible wall or skirt 6 and the rear end thereof by a one-piece flexible skirt in the form of an inflated bag 7.

The air forming the cushion 3 is drawn in from the atmosphere, through side intakes 8, by a compressor 9 housed within the vehicle 1 and driven by a variable-speed engine 10. The pressurized air is discharged to the space (the cushion space) occupied by the cushion 3 by a duct 11 and the hollow, inflatable bag 7 is inflated by air tapped off the duct 11 by a duct 12. The vehicle 1 is propelled by water-screw propellers 13 rotated by inclined shafts 14 located in the sidewalls 5. The shafts are driven by variable-speed engine and gearbox units 15. The vehicle 1 is steered by a pair of control surfaces in the form of steering rudders 20 arranged to work in unison. The rudders 20 are (preferably) of tapered section and are mounted beneath the vehicle on opposite sides of the longitudinal axis 27 (FIGS. 2 and 3 only) of the vehicle, and disposed in planes 22 which are inclined to the vertical and which intersect above the rudders 20. The planes 22 intersect at a point well above the rudders 20 and together define an acute angle. Each steering rudder 20 is pivoted about a substantially vertical axis 25 by a shaft 23 which penetrates the bottom edge of the associated sidewall 5 to extend upwardly through the sidewall 5 to connect with hydraulically-operated tiller apparatus 24 under the control, through hydraulic signal lines (not shown), of the pilot of the vehicle. Each of the rudders 20 make an angle of about 30°, i.e. between 25° and 35°, to the axis 25 of the associated shaft 23.

The arrangement demands the provision of only one seal (the seal 26 of FIG. 3) for each shaft 23 and allows the tiller apparatus 24 to be disposed immediately above the sidewalls 5 and in outboard positions where they are not inconveniently placed.

With reference to the diagrammatic FIG. 4, the inclined steering rudder arrangement results in the creation of horizontal (X) and vertical (Y) components of force. Components Y act in opposite directions and thereby set up a couple Y.d about the central longitudinal axis 27 of the vehicle 1, where d is the lateral distance between the centres of pressures of the rudders 20. This couple acts, when the vehicle executes a turn to starboard, as indicated by the arrow 30, to bank the vehicle into the turn. This banking effect is a desirable control feature. The hull structure side force exerted on the water is indicated by the arrows 36.

In the modification shown in FIG. 5, each hull structure 5 has inner and outer side surfaces 31, 32 disposed substantially parallel to each other. The inner side surface 31 of a hull structure 5 extends downwardly below the outer side surface 32 thereof. Each hull structure 5 also has a bottom surface 33 which presents a downwardly and inwardly sloping face disposed at substantially 45° to the horizontal and extending between the lower edges of the inner and outer side surfaces 31, 32.

In operation, as the craft "banks in" during a turn, water pressure acting normal to the inclined bottom surface 33 of the "upgoing" hull structure 5, as indicated by the arrows.34, assists the "banking in" moment by an upward component of thrust. Water pressure does not generate a significant upward component of thrust on the "downgoing" hull structure 5 due to the turbulence created by sideslip of the craft.

If desired, the knife-edges defined by the converging surfaces 31 and 33 can be cut back at the horizontal lines indicated at 35 so that the bottom surfaces 33 present horizontal as well as inwardly sloping faces. This modification eases the problem of sealing the propeller shafts 14 (FIG. 1) to the hulls 5.

Figure 6:
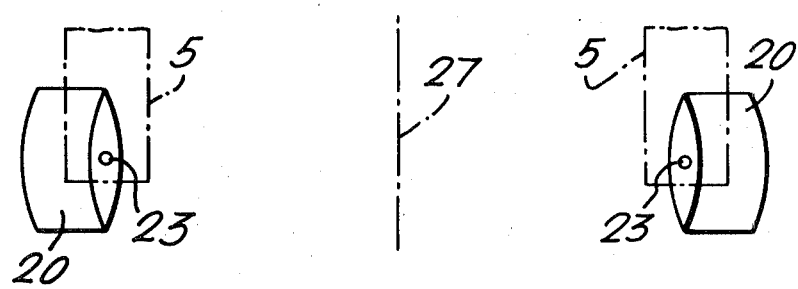
FIGS. 6 and 7 are diagrammatic plan views of the rear end of the vehicle and illustrate the steering control members in both neutral and steering positions.
Figure 7:
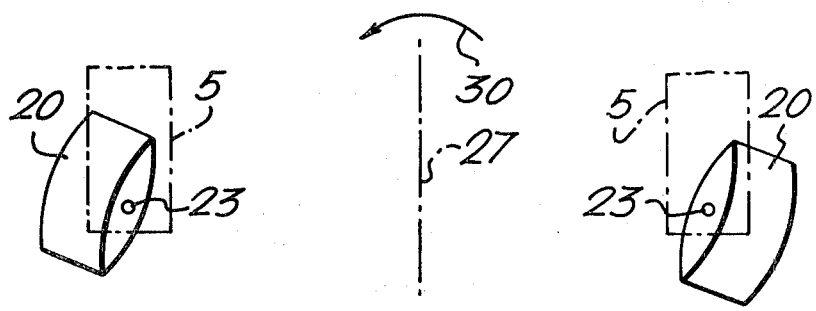

FIGS. 6 and 7 show, respectively, the relative positions of the steering rudders 20 in the neutral (FIG. 6) position and when the vehicle 1 is turning to port (FIG. 7), as indicated by the arrow 30.

In a (non-illustrated) modification of the arrangement shown in FIG. 5, the side surfaces 31, 32 are not substantially parallel to each other but converge slightly in a downward direction.

In another modification (see FIG. 8) of any of the above-described arrangements, the twin tiller apparatus 24 of FIG. 3 is replaced by a single hydraulic jack (51) of the double-acting type disposed between the upper ends of the rudder shafts 23, oppositely-extending actuating rods of the jack being connected, through rudder quadrants, with the upper ends of the shafts 23.

Figure 8:
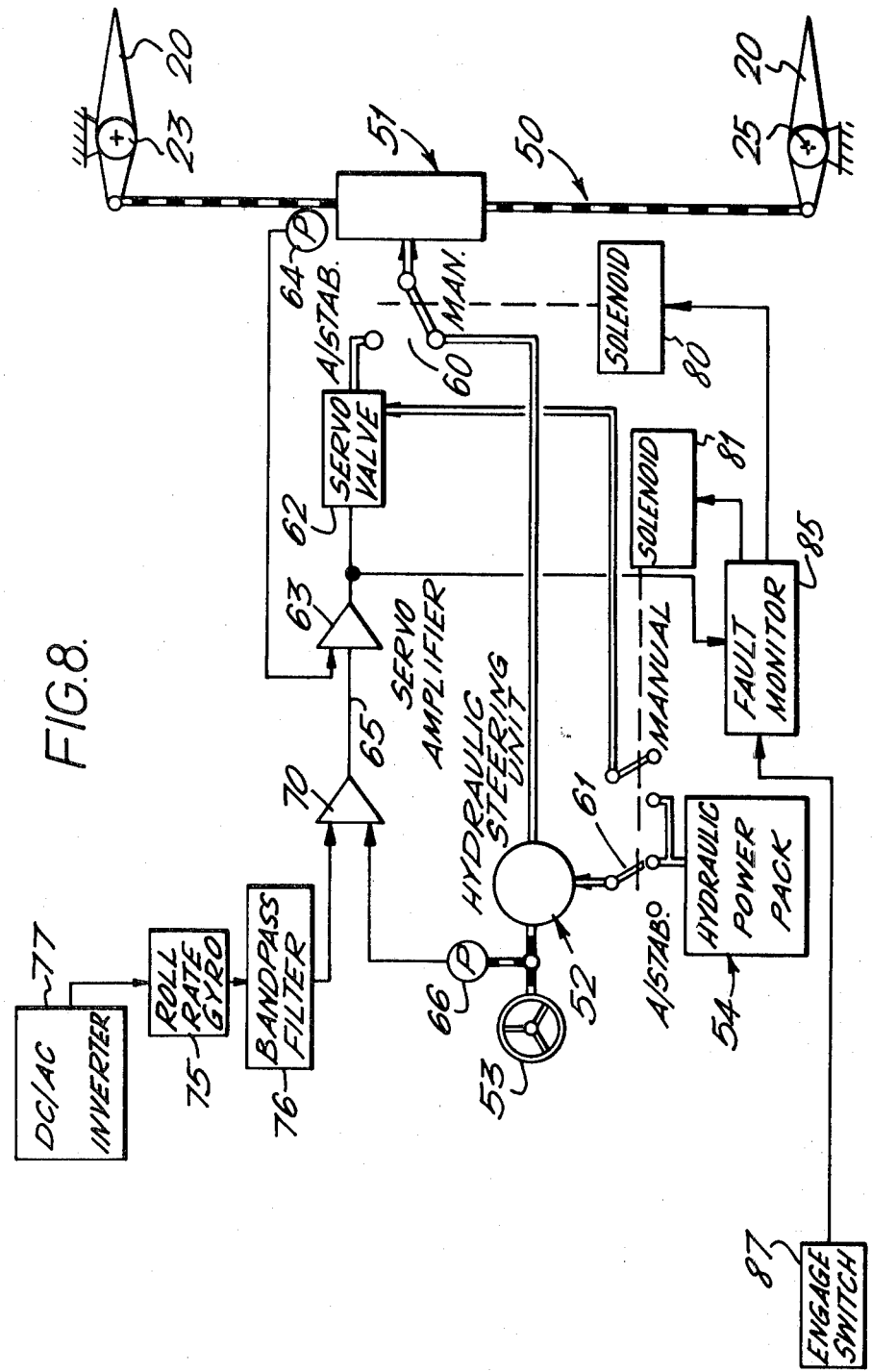
FIG. 8 illustrates an autostabilizer system for roll control.

With reference now to FIG. 8, which illustrates an autostabilizer system suitable for the vehicle 1, the inclined rudders 20 are coupled together by mechanical linkage 50 which includes a hydraulically-operated actuator 51 secured to the vehicle body 4 (FIG. 1).

High pressure oil is metered to the actuator 51 by means of a hydraulic steering unit 52 provided with a steering wheel 53. The actuator position and velocity are controlled by steering wheel (53) position and velocity via the hydraulic steering unit 52.

Hydraulic power, which is obtained from a conventional hydraulic pump/filter/tank unit 54, is connected to the hydraulic steering unit 52. The hydraulic pump of the unit 54 is driven by engine 10 (FIG. 1).

The steering control arrangement is disconnected by means of solenoid operated valves 60, 61. The hydraulic actuator 51 is driven by high pressure oil controlled by a roll servo valve 62. The servo valve 62, a servo amplifier 63 and a steering position sensor 64 together comprise a position command servo unit whereby the rudders 20 are moveable to positions proportional to a voltage applied to the servo amplifier 63 by input 65.

Steering commands are applied to rudders 20 by the steering wheel 53, the movement of which is detected by a position sensor 66 which functions as a steering command signal generator. Steering command signal voltages generated by sensor 66 are transmitted, via a summing amplifier 70, to the position command servo unit (62, 63, 64). Hence steering position commands from sensor 66 are backed off by a position feedback from position sensor 64.

A roll ride control function is added electrically to the steering function at summing amplifier 70. Sensing means in the form of an angular roll rate gyro 75 disposed within vehicle body 4 detects incipient undesirable motions of the vehicle about its roll axis and develops output signals, which applied to the rudder position servo unit 62, 63, 64, via, band pass filter 76, operate so as to continuously create restoring forces which act on the rudders 20. Rudder position commanded is therefore proportional to roll rate measured. Because the rudders 20 are displaced from the rolling axis of the vehicle, and because they are inclined outwardly, an effective (restoring) rolling movement is produced in such a direction as to oppose the undesirable vehicle rolling motion, and hence impove passenger comfort.

Angular roll rate gyro 75 is powered by a DC/AC inverter unit 77. An engage (i.e. master) switch 87 is provided.

The effectiveness of the ride control system can be adjusted to the particular craft dynamics by suitable design of the band pass filter 76, which selects the frequency band over which the system operates; hence rudder motion at high frequency is suppressed to minimise wear on the actuator. In a typical system the operating frequency is around 0.5 cycles/sec.

Fault monitor and engage logic means are provided. The function of the engage logic part of the system is to operate, by means of solenoids 80, 81 operating the valves 60, 61 so as to switch between normal "manual control" and "manual control plus roll ride control" configurations.

Since some single failures within the system could cause the steering rudders 20 to move to the limits of their normal travel, a fault monitor unit 85 is included which detects failures in the position servo control loop and immediately causes the solenoid operated valves 60, 61 to revert control back to the "manual control" configuration.

Figure 9:
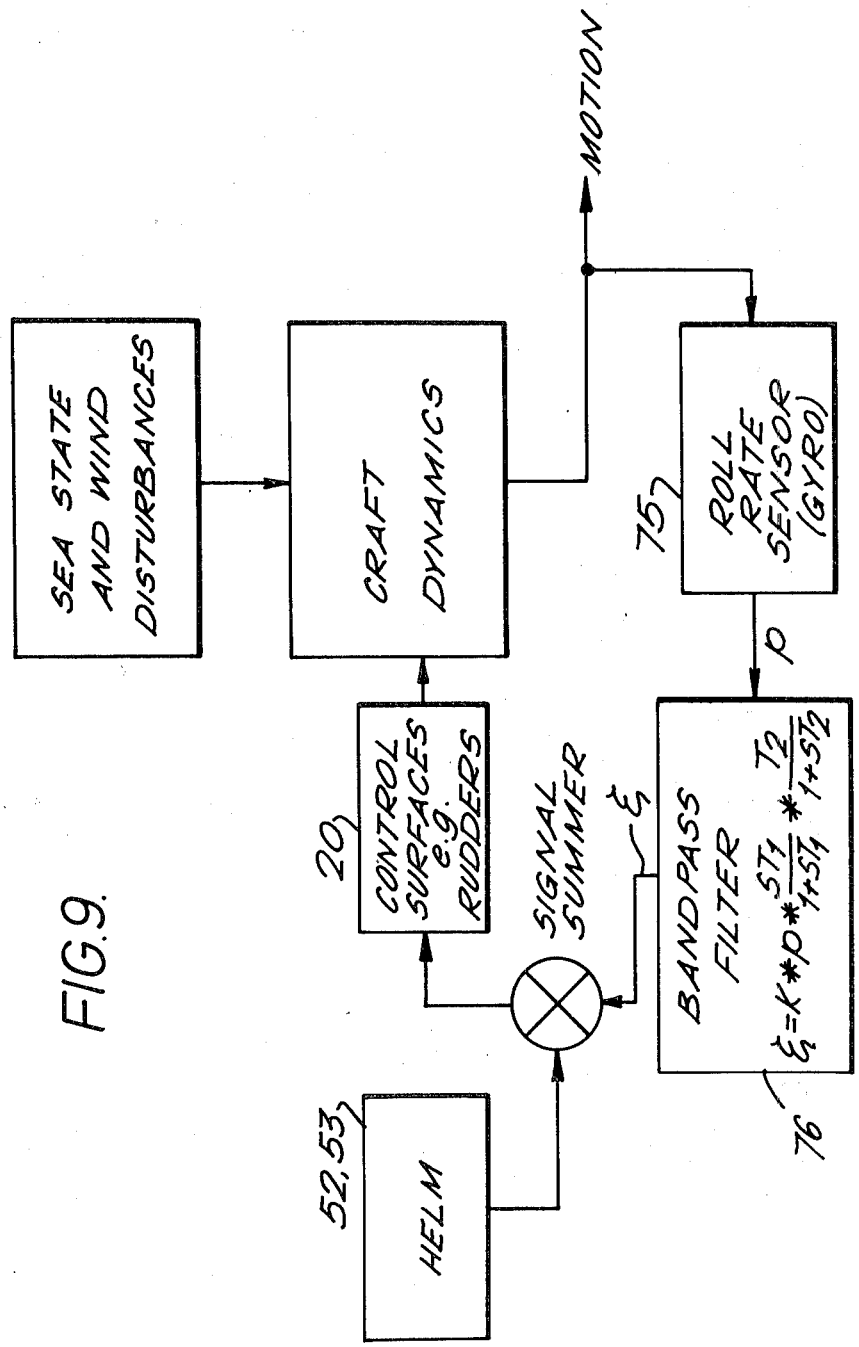
FIG. 9 illustrates how the system of FIG. 8 can be made more sensitive.

FIG. 9 illustrates how the control system can be made more sensitive, for example, and as shown in the figure, to sea state and wind disturbance. The band pass filter 76 which receives the roll rate gyro signal has a transfer function of the form indicated, that is to say $=K*P*(ST_1)/(1+ST_1)*(T_2)/(1+ST_2)$. In the expression T1 and T2 are time constants and S is the Laplace operator. In practice, T1 is in the general range of 120 to 20 seconds and T2 is in the general range of 0.5 to 2 seconds. The values of T1 and T2 depend on the size of the vehicle.

As stated above, the steering rudders 20 can be used for pitch control as well as for roll control. With reference to FIG. 6, to achieve pitch control, sensing means in the form of an angular pitch rate gyro can be used to detect incipient undesirable motions of the vehicle about its pitch axis. The rudders 20 are then operated, for example, by separate actuators under the influence of the pitch-rate gyro, whereby the leading edges of the rudders either converge or diverge, in unison, so as to correct an unwanted bow-up or bow-down attitude.

Control of incipient pitch and roll motions is achieved irrespective of whether the vehicle 1 is moving straight ahead or is turning. Irrespective of the orientation of the rudder 20 required to properly steer the vehicle, movements for controlling the incipient pitch and roll motions are superimposed on the steering movements. Response to roll are made substantially faster than responses to changes in direction. Consequently, although movements of the steering rudders 20 to correct roll will tend to initiate a change in vehicle heading, the corrections will take place before any significant changes in heading can occur.

Means may be provided whereby, and depending on the sea state, the system is made either mainly roll-sensitive, or, alternatively, mainly pitch-sensitive.

Figure 10:
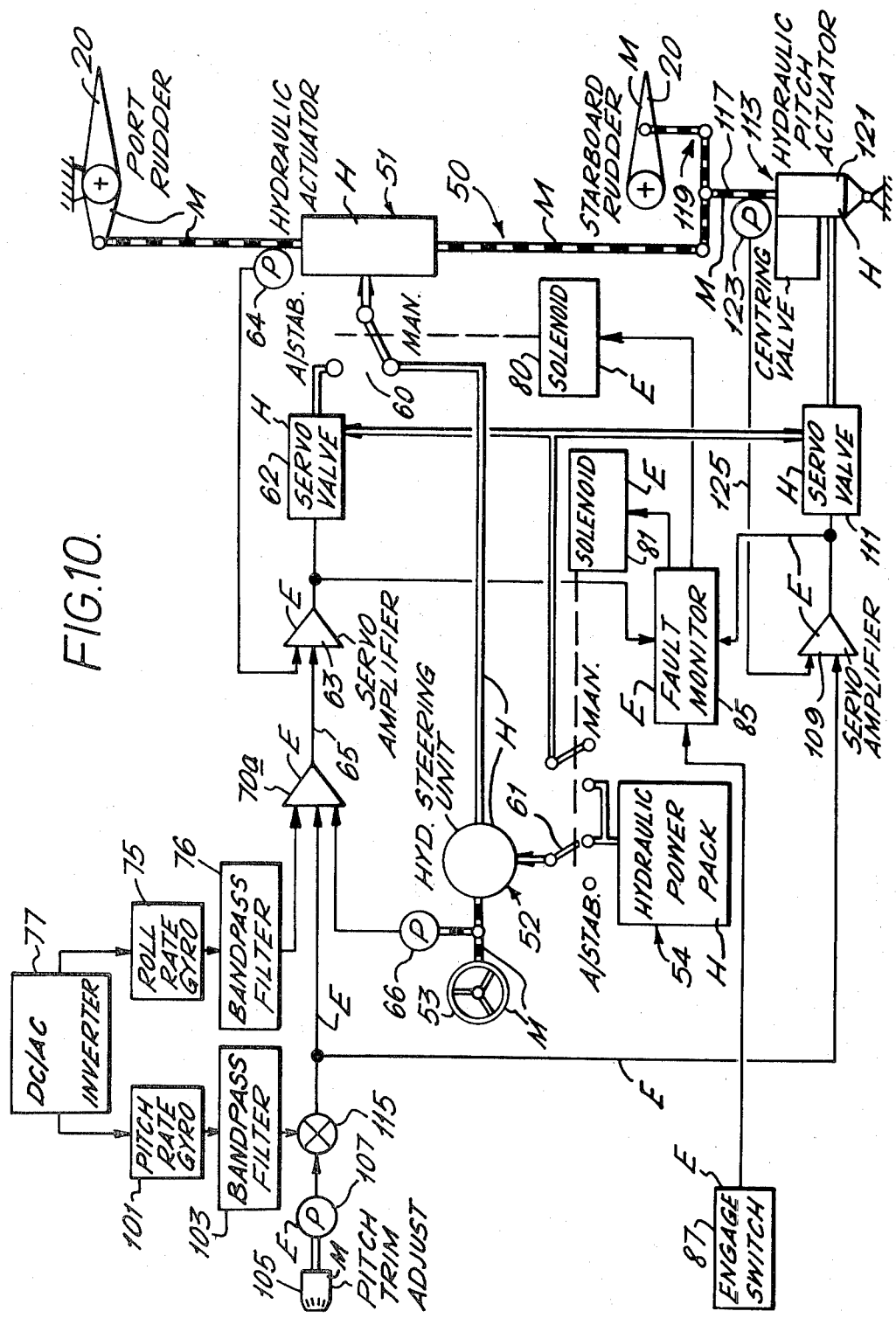
FIG. 10 illustrates a first combined pitch and roll damping system.
Figure 11A:
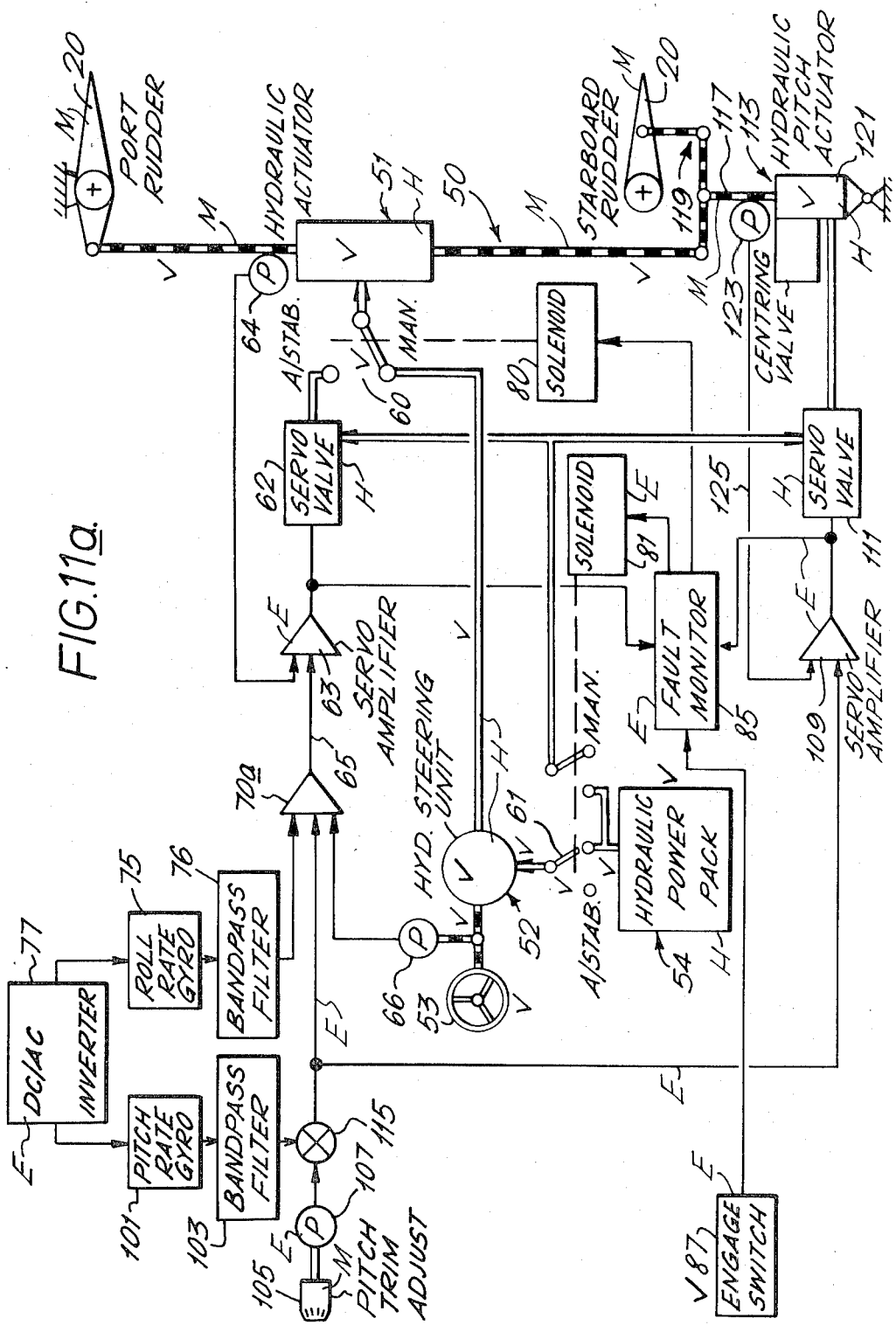
Figure 11B:
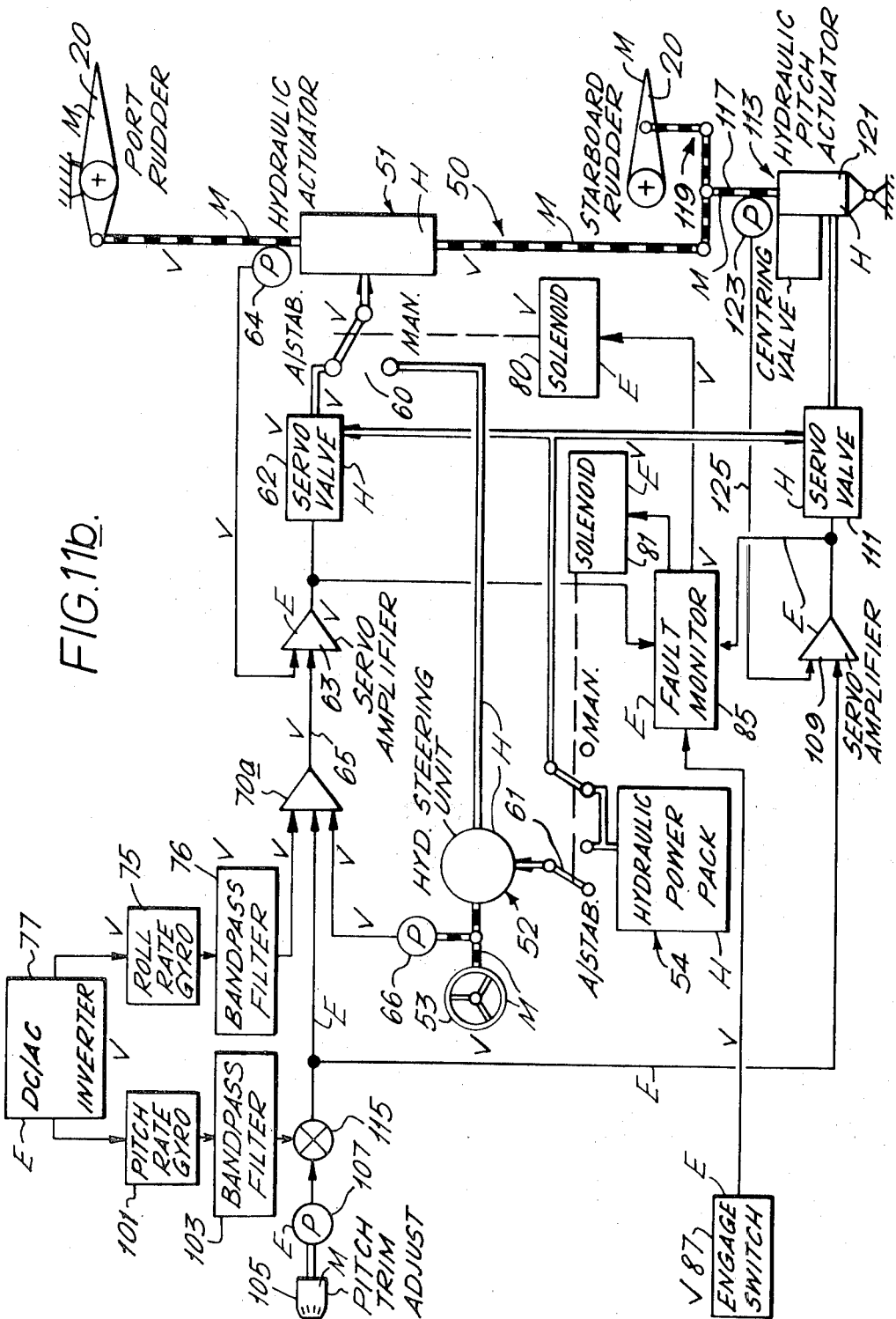
Figure 11D:
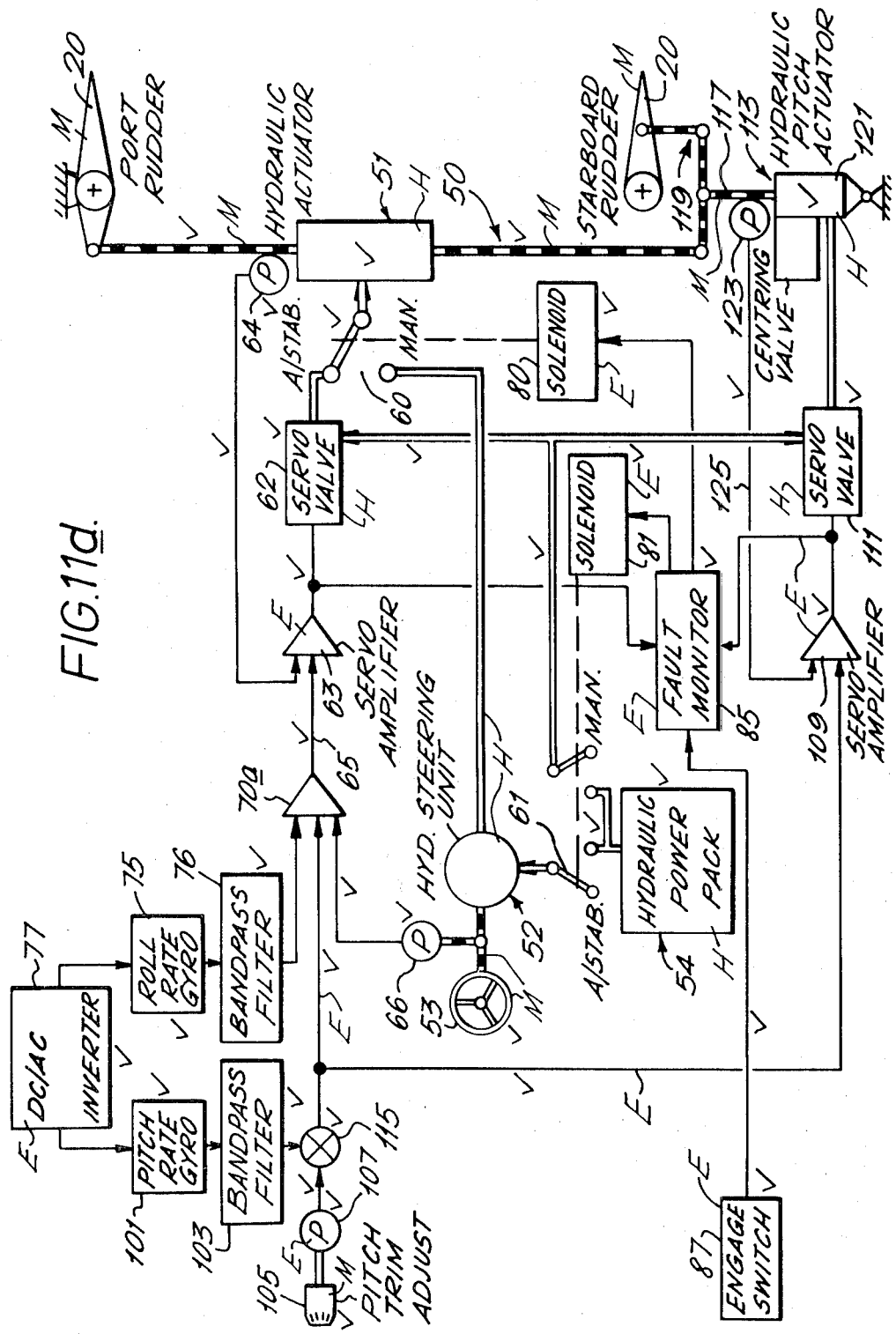

Referring to FIG. 10, the combined pitch and roll system illustrated thereby has, in addition to the elements already illustrated by FIG. 8, pitch sensing means comprising a pitch rate gyro 101, a band pass filter 103, a manual pitch trim adjust knob 105, a potentiometer 107, a servo amplifier 109, a servo valve 111, and a hydraulic pitch actuator and centring valve arrangement 113.

The pitch rate gyro senses incipient undesirable motions of the vehicle about its pitch axis and develops output signals, which are applied to the band pass filter 103. The signal output of the filter 103 is connected to a summing point 115 which also receives a pitch trim adjust output signal from the potentiometer 107. The output signal of the summing point 115 is connected to the summing amplifier 70a and to the input of the servo amplifier 109. The summing amplifier 70a also receives the output signal from the pitch rate gyro 101 by way of the band pass filter 103. Movement of the trailing edge of each steering rudder away from the vehicle centre line decreases the hydrodynamic lift generated by that rudder and movement towards the centre line increases the lift generated. For pitch changes the rudders are both moved towards or away from the centre line so as to increase or decrease the total lift at the rear of the vehicle and thus generate an increasing or decreasing pitch restoring moment on the vehicle.

The connections mentioned are electrical. Additionally, the servo valve 111 has an hydraulic line connectable to the hydraulic power source (pack) 54 by actuation of the autostabilizer change over mechanism 61. There is a mechanical connection 117 between the piston of the actuator 113 and an articulated link 119 to, say, the starboard inclined rudder 20. The body 121 of the actuator 113 is secured to the vehicle body.

Finally there is an electrical position feed-back from the actuator output by way of potentiometer 123 and an electrical connection 125 to the input of the servo amplifier 109.

The demand signal applied to the servo amplifier 109 by the summing point 115 is backed off by the signal developed at the output of the potentiometer 123 as a result of control movements of the pitch actuator 113. The compensating motions of the roll and pitch actuators 51 and 113 respectively are compounded in the mechanical linkage M, which includes components 50, 117 and 119. The resultant compound motion generates appropriate movements of the steering rudders 20 so as to apply dynamic restoring forces opposing the undesirable incipient pitch and roll movements of the vehicle.

The operation of the combined system in manual, roll ride control, pitch ride control, and combined pitch and roll ride control is illustrated by FIGS. 11a, 11b, 11c and 11d respectively.

In each of these figures, the elements of the system bearing for ease of recognition, an additional label, M, H or E, accordingly as the element in question is a mechanical, essentially an hydraulic or essentially an electrical part.

Further, those elements which are active in each control configuration, or mode, are identified by the symbol "✓".

As may be gathered, from a consideration of the system operation in the various modes represented, for pitch damping a differential movement of the inclined rudders 20 is superimposed on the steering and roll damping synchronized or harmonized motion of the rudders.

The differential motion of the inclined rudders has, of course, the effect of varying the effective areas of the rudders opposing pitching motion of the craft.

FIG. 12 illustrates an alternative combined pitch and roll damping system for the craft.

Whereas the system of FIG. 10 is an electrically-signalled combined steering and motion damping system with optimal reversion to hydraulic steering only the system of FIG. 12 is an optimal electrically signalled motion damping system, the output of which is combined with a separate hydraulic steering system.

Two low authority actuators 131 and 133 are employed. Hydraulic servo valves 135 and 137 control the actuators 131 and 133 respectively, in response to electrical signals from summing amplifiers 139 and 141. The amplifiers 139, 141 receive signals from rate sensors and band pass filter units 145 and 147. Units 145 and 147 receive control signals from a control and monitoring unit 160 which also controls a solenoid valve unit 161. There is an electrical position feedback from potentiometers 149 and 151 respectively associated with the actuators 131 and 133.

As before the differential pitch damping movements are superimposed on the synchronized steering (and roll damping) movements applied to the inclined rudders. The variation in apparent area (in plan) in response to incipient pitching motions of the craft has the effect of producing forces opposing those pitching motions.

The pitch trim facility enables the steady state pitch attitude to be adjusted to take account of the center of gravity and weight variations and, hence, to adjust the craft attitutde to obtain optimum operational efficiency.

Figure 13:
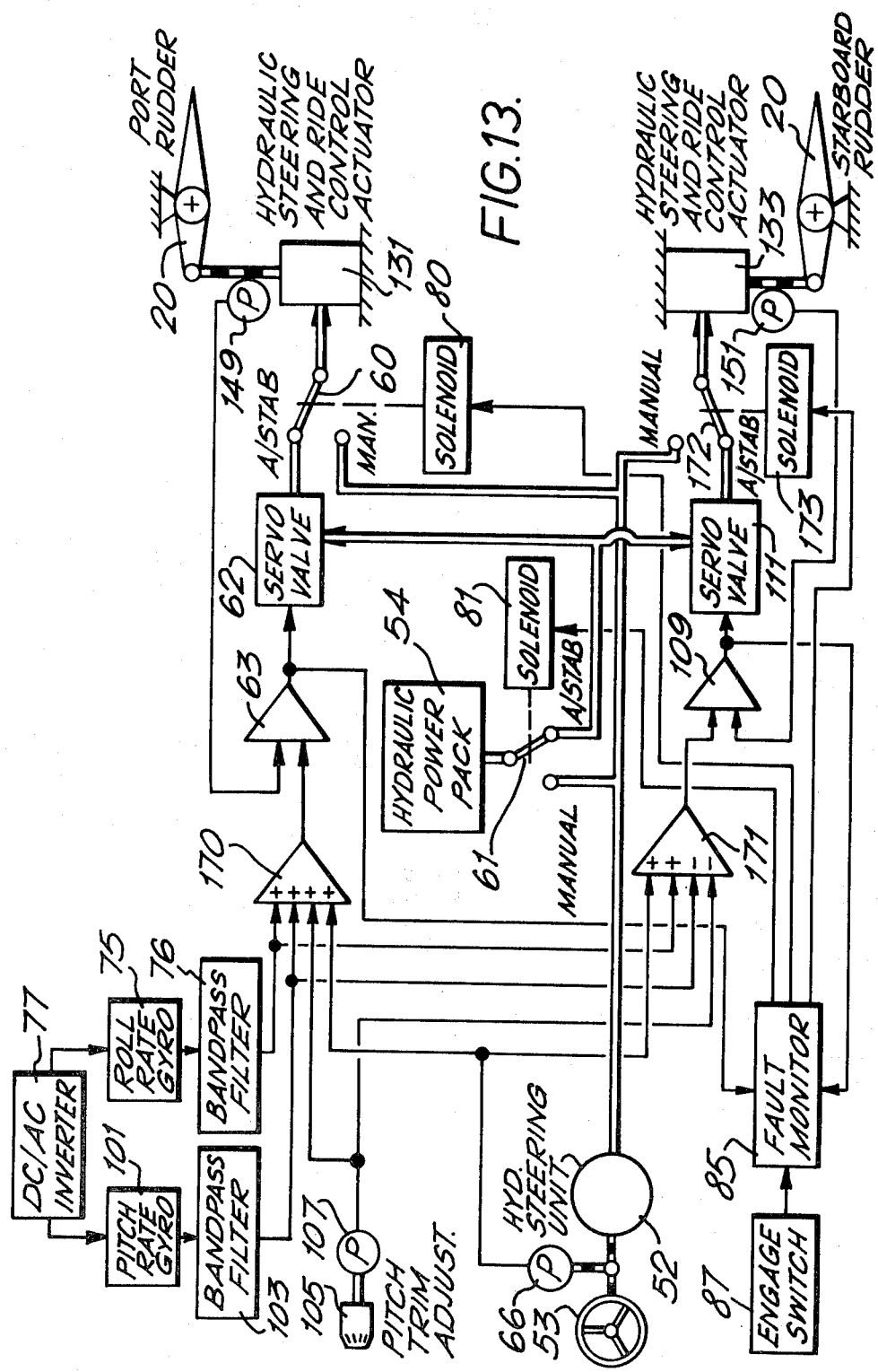

FIG. 13 illustrates a further alternative combined pitch and roll damping system for the vehicle.

Whereas the system of FIG. 10 uses a single hydraulic actuator to operate both rudders for steering and roll movements, the system of FIG. 13 uses two separate actuators, namely 131 and 133. In this respect the system is similar to that depicted in FIG. 3.

The amplifiers 170 and 171 sum the steering, pitch trim, roll control and pitch control signals from the potentiometers 66 and 107 and filters 76 and 103 in the appropriate algebraic senses. The outputs of the amplifiers 170, 171 are applied to separate rudder position command servo units. One servo unit comprises servo amplifier 63, servo valve 62, actuator 131 and feedback potentiometer 149. The other servo unit comprises servo amplifier 109, servo valve 111, actuator 133 and feedback potentiometer 151.

The vehicle is steered by the electrical signals from potentiometer 66.

Roll damping, pitch trim and pitch damping motions can be superimposed on steering rudder movements in any combination. Roll damping motions involve symetrical movements of the rudders 20, and are initiated by signals emitted by the band pass filter 76. Pitch damping motions are initiated by signals emitted by the band pass filter 103. Pitch trim is controlled by signals developed as a result of manual adjustment of the potentiometer 107.

Also shown in FIG. 13 is an optional manual steering system comprising the hydraulic steering unit 52 and the changeover valves 60, 61 and 172 operated by solenoids 80, 81 and 173.

The operation of the system of FIG. 13 is similar to that of FIG. 10 but the use of separate actuators for the steering rudders 20, thus eliminating the need for mechanical linkage 50, is more convenient for larger vehicles.

We claim:

1. A marine vehicle, comprising:
   a pair of rotatable steering rudders mounted beneath the vehicle and on opposite sides of the longitudinal axis thereof, the rudders being disposed in planes which are inclined to the vertical and which intersect above said axis; and,
   means for sensing incipient undesirable motions of the vehicle about the pitch and roll axes of the vehicle, and operable so as to continuously apply restoring forces to the vehicle by rotating the rudders in movements which are compounded with steering movements of the rudders.

2. A marine vehicle as claimed in claim 1, wherein the means for sensing incipient undesirable motions of the vehicle comprise angular rate means.

3. A marine vehicle as claimed in claim 1, wherein the means for sensing incipient undesirable motions of the vehicle comprise accelerometer means.

4. A marine vehicle as claimed in claim 1, wherein the output of the motion-sensing means is applied to a band pass filter of predetermined transfer function and the filtered sensing signal is applied to a summing point, to which is also applied a steering command signal.

5. A marine vehicle as claimed in claim 1, provided with angular rate sensor means, steering command signal generating means, rudder actuator means, band pass filter means for receiving the output of the rate sensor means, signal summing means for combining the outputs of said band pass filter means and said steering command signal generating means, and for providing a compound signal output for application to said rudder actuator means and which comprises a steering signal component and an angular motion damping signal component.

6. A marine vehicle as claimed in claim 5, wherein the band pass filter means are operable so as to produce, from roll rate sensor means, a signal which, when applied to the rudder actuator means, produces a synchronous perturbation in the movement of the rudders effective to introduce a measure of roll damping.

7. A marine vehicle as claimed in claim 6, provided with twin actuators for operating the pair of steering rudders, and pitch rate sensor means, the band pass filter means being operable, additionally, to produce from the pitch rate sensor means a signal which, when applied differentially to the twin actuators, produces differential movement in the steering rudders so as to vary the apparent areas (in plan) thereof whereby vertical forces are induced which act on the vehicle so as to oppose pitch motion.

8. A marine vehicle as claimed in claim 1, comprising a gascushion vehicle, wherein, in operation, the sides of its vehicle-supporting cushion are contained by a pair of laterally-spaced "side" wall structures extending longitudinally along the sides of the vehicle body in substantially parallel array and depending therefrom so as to dip into the water and form a cushion-gas seal.

9. An autostabilizer system for a marine vehicle provided with twin steering rudders mounted beneath the vehicle and on opposite sides of the longitudinal axis thereof, the rudders being disposed in planes which are inclined to the vertical and which intersect above the rudders, said stabilizer system comprising angular rate sensor means, steering command signal generating means, rudder actuator means, band pass filter means for receiving the output of the rate sensor means, signal summing means for combining the outputs of said band pass filter means and said steering command signal generating means, and for providing a compound signal output for application to said rudder actuator means and which comprises a steering signal component and an angular motion damping signal component.

10. A method for augmenting the stability of a marine vehicle about its pitch and roll axes, the vehicle having a pair of steering rudders mounted beneath the vehicle and on opposite sides of the longitudinal axis thereof, said rudders being disposed in planes which intersect above said longitudinal axis, comprising the steps of:

sensing incipient undesirable motions about the pitch and roll axes of the vehicle; and, operating the rudders in dependence upon the sensed undesirable motions, developing hydrodynamic forces at the rudders which are superimposed on steering movements of the rudders and which oppose the undesirable motions.

11. A marine vehicle as claimed in claim 1, wherein the rudders are disposed at the stern of the vehicle.

12. A marine vehicle as claimed in claim 1, wherein the means for sensing motions and applying restoring forces rotates the rudders simultaneously, the simultaneous movements being compounded with the steering movements of the rudders.

13. A marine vehicle, comprising:

a pair of rotatable steering rudder means mounted beneath the vehicle and on opposite sides of the longitudinal axis thereof, the rudder means being rotatable about axes which are inclined to the vertical and which intersect above said longitudinal axis; and, means for sensing incipient undesirable motions of the vehicle about the pitch and roll axes of the vehicle, and operable so as to continuously apply restoring forces to the vehicle by rotating the rudder means in movements which are compounded with steering movements of said rudder means.

14. A marine vehicle as claimed in claim 13, wherein the means for sensing motions and applying restoring forces rotates the rudder means simultaneously, the simultaneous movements being compounded with the steering movements of the rudder means.

15. A marine vehicle as claimed in claim 13, wherein the output of the motion-sensing means is applied to a band pass filter of predetermined transfer function and the filtered sensing signal is applied to a summing point, to which is also applied a steering command signal.

16. A marine vehicle as claimed in claim 13, comprising a gas-cushion vehicle, wherein, in operation, the sides of its vehicle-supporting cushion are contained by a pair of laterally-spaced "side" wall structures extending longitudinally along the sides of the vehicle body in substantially parallel array and depending therefrom so as to dip into the water and form a cushion-gas seal.

* * * * *